Sept. 19, 1967 J. W. SMITH ET AL 3,342,973
WELDING METHOD

Filed April 7, 1966 2 Sheets-Sheet 1

INVENTORS
JOSEPH W. SMITH
DIGBY E. WHITE
BY Fishman & Van Kirk
ATTORNEYS

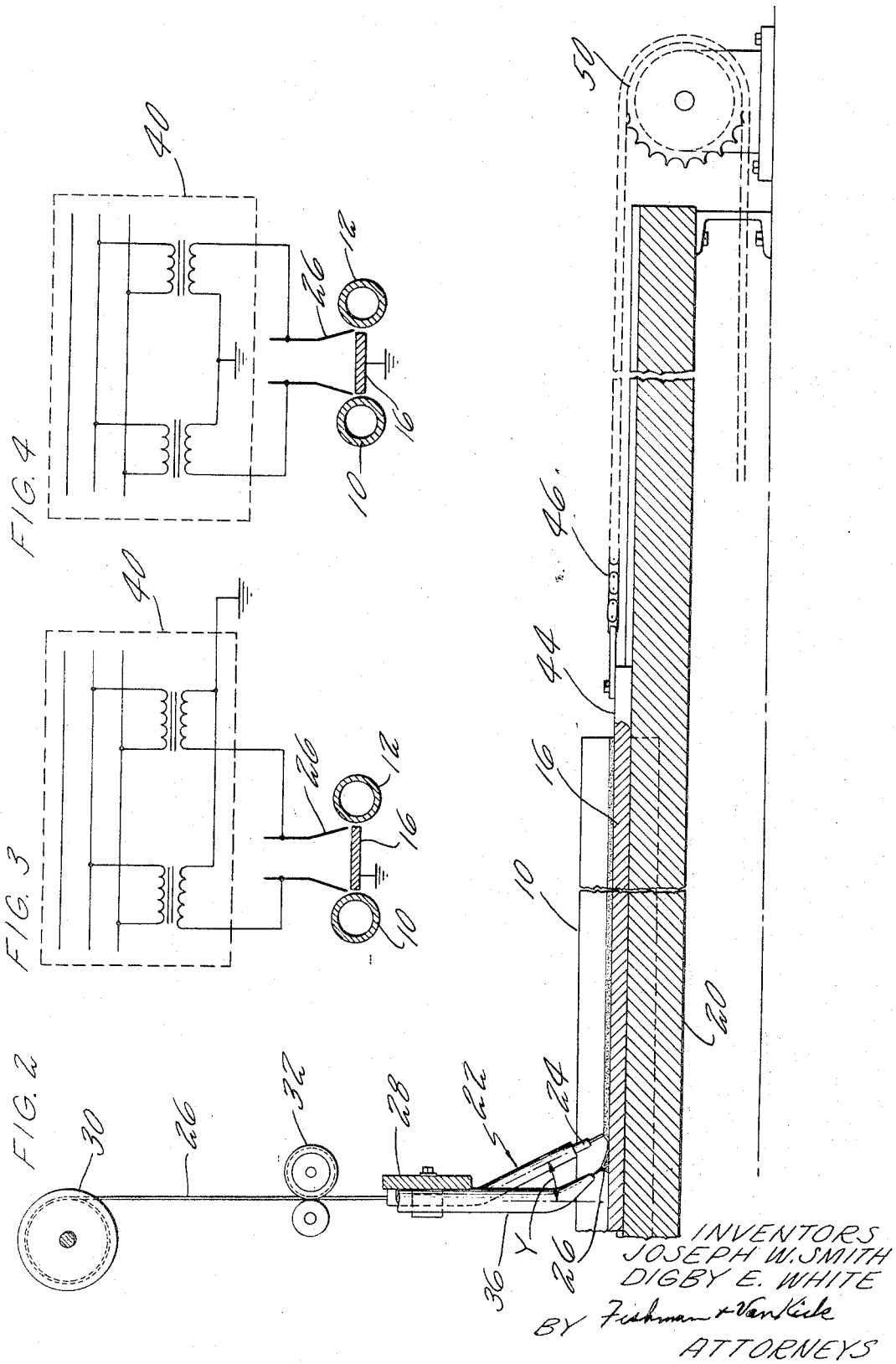

United States Patent Office 3,342,973
Patented Sept. 19, 1967

3,342,973
WELDING METHOD
Joseph W. Smith, Chattanooga, Tenn., and Digby E. White, Ringgold, Ga., assignors to Combustion Engineering, Inc., Windsor, Conn., a corporation of Delaware
Filed Apr. 7, 1966, Ser. No. 541,017
3 Claims. (Cl. 219—137)

ABSTRACT OF THE DISCLOSURE

The submerged arc welding of parallel tubular members to web members disposed therebetween. Critical welding parameters are disclosed which permit the making of welds from one side only, the fusion zone extending all the way through the web members but not through the walls of the tubular members.

BACKGROUND OF THE INVENTION

(1) Field of the invention

This invention relates to the joining of a plurality of members to form an integral unit. More particularly, this invention is directed to the welding together of a plurality of parallel members. Accordingly, the general objects of this invention are to provide new and improved methods and apparatus of such character.

While not limited thereto in its utility, this invention has been found to be of particular value in the fabrication of multiple tube, heat exchanger panels. In recent years, particularly in the steam generator field where the units are getting ever larger, there has been a trend toward use of prefabricated heat exchanger panels. These panels, which may be fabriacted at a first location and thereafter shipped to a generator station site for assembly into a unit, comprise a plurality of laterally spaced, parallel tubes which are joined together into an integral unit by means of elongated web or fin members disposed between adjacent tubes. The many technological and economic advantages realized from shop fabrication of the heat exchanger panels followed by onsite boiler erection are well known and will not be reiterated herein. For further discussion of such advantages, reference may be had to U.S. Patent No. 3, 127,503, issued Mar. 31, 1964, to K. B. Garner et al., and assigned to the same assignee as this invention.

(2) Description of the prior art

In the prior art, attempts to fabricate panels of the type described above have encountered various obstacles. Obviously, the preferred fabrication method is welding. While various welding techniques have been tried, success has for the most part been limited to employment of arc welding and, more particularly, the technique commonly known as submerged arc welding. Regardless of the type of welding employed, heat induced distortion of the tubes has caused warping of the panels during fabrication. In order to minimize this distortion and warping, it has been common practice to join the fins or webs to the tubes by first welding part way through from one side and then turning the entire panel over and completing the weld from the reverse side. From an economic standpoint, the time consuming task of reversing the panels and making a second weld pass is undesirable. A problem closely allied with the above-mentioned heat induced distortion is over-penetration of the walls of the tubular members. In order to preserve the integrity of the tubes, the fusion zone cannot penetrate completely through the walls thereof. As the total energy input to the work increases, incident to an effort to accomplish a complete weld from one side of the panel only, the penetration of the fusion zone into the tube walls will similarly increase.

SUMMARY OF THE INVENTION

This invention overcomes the aforementioned disadvantages and problems of the prior art and provides for the fabrication of assemblies by means of a single-step welding operation.

It is therefore an object of this invention to provide for the welding together of a plurality of metallic members.

It is another object of this invention to join together a plurality of tubular members via members disposed intermediate thereof.

It is also an object of this invention to provide for the welding together of an assembly of alternate tubular and solid members in a single welding operation.

It is a further object of this invention to provide for the joining together of tubular and intermediately disposed nontubular members by welding from one side only.

It is yet another object of this invention to fabricate heat exchanger panels.

These and other objects of this invention are accomplished by sumerged arc, alternating current welding wherein the unwelded tubular and intermediate members are properly oriented in relation to each other and thereafter caused to move relative to the welding apparatus. Through the combination of properly adjusted welding apparatus, the application of alternating currents thereto, proper selection of the welding flux and by causing movement of the work with relation to the stationary welding electrodes at the proper speed, welds are produced which are characterized by a fusion zone extending completely through the intermediate or web members but penetrating only slightly into the walls of the tubular members, and these welds are made from one side of the work.

BRIEF DESCRIPTION OF THE DRAWING

This invention may be better understood and its numerous advantages will become apparent to those skilled in the art by reference to the accompanying drawing wherein like reference numerals refer to like elements in the various figures and in which:

FIGURE 2 is a partial side view of the apparatus depicted in FIGURE 1.

FIGURE 3 is a schematic illustration depicting the practice of this invention by employment of in-phase alternating currents.

FIGURE 4 is a schematic illustration depicting the practice of this invention by employment of ourt-of-phase alternating currents.

DESCRIPTION OF THE PREFERRED EMBODIMENT

Figure 1:
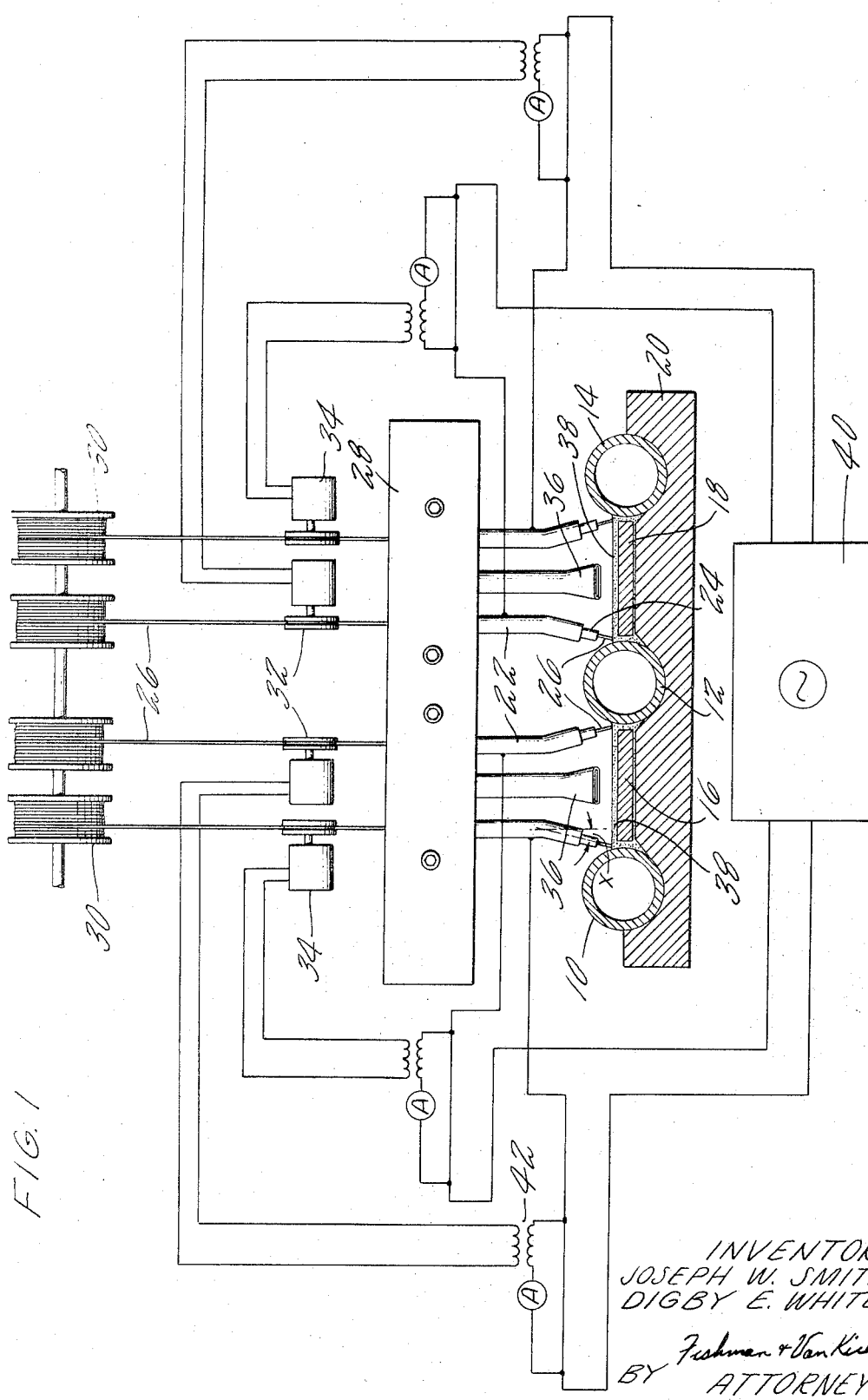
FIGURE 1 is an end view, partially in section, of apparatus adapted for use in the practice of this invention.

Referring now to FIGURE 1, a plurality of metallic tubes 10, 12 and 14 are to be joined, via solid web members 16 and 18, to form a heat exchanger panel. The tubes and web members are positioned in substantially parallel relationship on a back-up member or shoe 20. Member 20 typically will be comprised of copper, or other suitable conductive material, and will have passages therein for the flow of a coolant therethrough. Back-up member 20 has grooves therein of suitable shape and depth and suitably spaced to accept and thus properly orient tubular members 10, 12 and 14 relative to one another. The height of back-up member 20 intermediate the grooves therein is such that it will support web members 16 and 18 spaced from but adjacent to the tubular members at the point of minimum separation therebetween. The gaps thus formed between the tubular and web members define, in the example being described, four seams to be welded.

Suspended above and extending to points adjacent each of the seams to be welded are expendible electrodes and a holder therefor. The electrode assemblies comprise a tubular outer member 22 and a weld nozzle 24 through both of which a consumable electrode wire 26 is fed. The welding arc is struck between the electrode wire and work. The electrode assemblies are suspended from a support member 28 and members 22 may be individually adjusted, by means not shown but common in the art, so as to vary the angles the electrodes 26 make with the seams to be welded.

The members 22 of the electrode assemblies terminate in support 28 and are insulated therefrom. The consumable electrode wires 26 are stored on drums 30 and fed, by means of rollers 32, into the tubular outer electrode members 22 at the ends thereof disposed in support 28. The drums 30 and rollers 32 are, of course, suitably insulated from other equipments. Each of feed rollers 32 is driven by a motor unit 34. Motor units 34 comprise servo systems each of which comprises a motor and associated control circuitry. The motors cause rollers 32 to pull the consumable electrode wires off rolls 30 and feed them through the tubular portions of the electrode assemblies and into the arcs at a rate which is consistent with maintenance of the arcs.

Also suspended from support 28 and fed from a source, not shown, are a plurality of flux nozzles 36. A submerged arc welding flux, shown at 38, is deposited on the web members 16 and 18 via nozzles 36. As previously mentioned, in accordance with this invention, welding is affected utilizing a submerged arc type flux which fuses into a liquid when current passes therethrough between the electrodes and work. The flux is of a granular consistency having a fineness or mesh size which has been found to be critical. The flux blankets the top of web members 16 and 18 and sifts downwardly through the seams to be welded so as to fill the gaps between the tubular members and web members.

Welding current is supplied to each of electrodes 26 from an alternating current source 40. The construction of the electrode assemblies is such that permanent electrical connections can be made to the tubular members 22 thereby assuring continuous contact between consumable electrode wires 26 and the current source as the wires are fed into the arcs. The return path for the welding current is through back-up shoe 20 which, as noted above, is preferably made of copper. The current supplied to each electrode is sensed by a transformer 42 the primary winding of which is shunted across the connection between current source 40 and the electrode. The voltage induced in the secondary winding of the current sensing transformers 42 is applied to motors 34 to, in a manner well known in the art, increase or decrease the rate at which the electrode wires are fed into the arc. In this manner the arc current for each electrode may be maintained at a preselected value.

Referring now to FIGURE 2, one means for producing relative motion between the work and welding electrodes is shown. Initially a short bar or web member 44 is tack welded or clamped to the lead end of webs 16 and 18 and the web members are tacked or clamped to the tubular members. Member 44 has a threaded hole therein so as to enable a chain 46 to be bolted thereto. Chain 46 is engaged by a sprocket 50 which is driven by a variable speed motor, not shown. By causing sprocket 50 to rotate at a preselected speed, the work comprising tubular members 10, 12 and 14 and intermediate web members 16 and 18 may be pulled past stationary welding electrodes 26 at the proper speed to insure complete welding. Of course, the work may be driven past the welding station rather than being pulled.

FIGURE 3 shows, in schematic form, the electrical connection which will be employed when the spacing between adjacent tubular members is 1½ inches or less. With such spacing, it has been found that optimum results are achieved if the currents applied to electrodes positioned at opposite sides of any one web member are in phase. If the spacing between the tubular members is in excess of 1½ inches and the tubular members have a wall thickness greater than .165 inch, while in phase currents may still be employed, out-of-phase currents generally produce the optimum results. This is true even though, for example, three phase current will, all other conditions being the same, result in greater penetration of the tube walls than in phase currents. In FIGURE 4, the currents applied to the electrodes are 180° out of phase.

When welding in accordance with this invention, the first step comprises the positioning of the tubular and web members on back-up shoe 20. Next, the tubular and web members are joined at points adjacent the leading ends thereof by clamping or tack welds. Member 40 is, at the same time, tack welded or clamped to the ends of the web members and the chain 42 attached thereto.

After readying the work, the welding apparatus must be adjusted so as to produce the desired results. The setting up of the welding apparatus comprises the proper positioning of the electrode assemblies, adjusting the power supply and electrode wire feed means and setting the speed of the driving means for chain 42. As may be seen from FIGURE 1, the electrodes are spaced from the seams to be welded and angled with respect thereto. In the practice of this invention, it has been found that the ends of welding nozzles 24 should be from ⅝ to ¾ inch from the work. This contrasts with prior art arc welding techniques wherein the normal nozzle to work distance is approximately 3 times the electrode wire diameter. In the case of the usual ⅛ inch diameter electrode, a spacing of 1 inch would previously have been deemed desirable. The angle the electrodes make with perpendicular planes defined by the sides of the web members has been exaggerated in FIGURE 1. Typically, this angle will be 1°. The angle y which the welding electrodes make with the vertical, in the direction of welding, may vary from zero to 15°. However, optimum results have been obtained with an angle of at least 5° and an angle of 6° has been found to be preferable. The angle in question, while shown exaggerated, may be seen clearly from FIGURE 2. The speed of movement of the work with relation to the stationary electrodes will vary in accordance with other welding parameters. However, in order to obtain complete penetration while employing alternating current in accordance with this invention, speeds of less than 30 inches per minute are to be preferred. Thus, in setting up the equipment, the means for driving sprocket 48 is adjusted so as to cause chain 46 to pull the work past the electrodes at a speed usually in the range of 22 to 26 inches per minute. For a speed within this range and the electrode angles and spacing previously mentioned, alternating current source 36 is set so as to deliver between 500 and 750 amperes, and usually between 580 and 700 amperes, to each electrode. For a particular welding operation, the actual current employed will be within this range and will be determined by the size and composition of the work. As should be obvious, in order to obtain a fusion zone which completely penetrates the web member while not completely penetrating the walls of the tubular members, it is necessary to adjust the angles, spacing, work travel speed and current wherein the ranges mentioned above to obtain optimum results.

Also, to weld in accordance with this invention, it is necessary that the flux to be deposited on web members 16 and 18 be properly selected. As noted above, the flux employed should be a granular type, submerged arc welding flux having a suitable fineness or mesh size. Tests have shown that, in order to obtain optimum results employing the alternating current welding method of this invention, the flux should have a fineness of from 10 x 150 mesh to 20 x 150 mesh, with a fineness of 12 x 150 mesh being optimum. While not absolutely necessary to obtain good results in the practice of this invention, an agglomerate rather than a fused flux is preferable. A fused flux is one that is heated to form a cake and thereafter ground to the proper mesh size. An agglomerate flux is one that is made of ingredients mixed with a binder such as sodium silicate and thereafter ground to the proper mesh size. In the practice of this invention, the particle size of the flux has a significant effect on results. Therefore, use of a flux having uniform pellet size is important and, for this reason, an agglomerate or pelletized flux is preferable.

In welding, after the set up procedure described above, deposition of flux 38 on web members 16 and 18 at the proper rate is initiated. Next, drive is applied to chain 46 and the proper circuit breakers are closed to cause the arcs to be struck between the electrodes, tubular members and web members. As the work is pulled under the electrodes, and the arcs and arc currents maintained by means of sensing the electrode currents and feeding the electrode wires into the arcs at the proper rate, the electrode, web and tube materials melt and thereafter fuse to form a fusion zone which extends the width of the web members but only partially into the walls of the tubular members. As a result, the side edges of the web members are united to the tube walls by thorough fusion therewith. The water cooled, back-up shoe 20 maintains good contact with the work and thus provides a return path for welding current. Also, as the fused material is drawn past the electrodes, the upper surface of back-up shoe 20 acts as a chill bar for the molten metal as it solidifies.

In a typical example, a good weld without over-penetration of the tube walls was achieved with the following work sizes and welding parameters:

(1) Tube material=SA–192 seamless carbon steel.
(2) Tube outer diameter=2 inches.
(3) Tube wall thickness=.220 inch.
(4) Web material=SA–107 hot rolled carbon steel.
(5) Web thickness=.250 inch.
(6) Web width=2 inches.
(7) Electrodes=Hobart mild steel (uncoated).
(8) Electrode wire diameter=.125 inch.
(9) Flux=Hobart type 400 with a fineness of 12 x 150 mesh.
(10) Travel speed=22 inches/minute.
(11) Angle $x=1°$.
(12) Angle $y=10°$.
(13) Electrode spacing from work=approximately ⅛ inch (weld nozzles located ⅝ inch above web members).
(14) Electrode currents=650 amperes (in-phase) per electrode.
(15) Electrode feed rate=116 inches per minute.
(16) Weld seam width=.094 inch.

While preferred embodiments have been described, various modifications and substitutions may be made without departing from the spirit and scope of this invention. Accordingly, it is to be understood that this invention has been described by way of illustration and not limitation.

What is claimed is:

1. A process for joining spaced metallic tubular members comprising:

placing the tubular members in substantially parallel spaced apart relationship on a support;
supporting elongated metallic web members intermediate but spaced from the tubular members at the point of minimum separation therebetween, the gaps thus formed between the tubular and web members defining seams to be welded;
locating the free end of an expendable welding electrode adjacent to each seam to be welded and aligning the electrodes in a plane perpendicular to the axes of the tubular members;
depositing granular submerged arc type welding flux having a fineness of from 10 x 150 mesh to 20 x 150 mesh on the web members and in the seams beneath the electrodes;
applying alternating currents in the range of 500 to 750 amperes to the electrodes to establish intermittent arcs between each electrode and the adjacent tubular and web members to thereby cause fusion of the electrode material, tubular member and web members;
feeding the tubular and web members past the electrodes so that the seams to be welded will be moved relative to the electrodes at a speed not in excess of 30 inches per minute;
continuing to deposit the flux adjacent the stationary electrodes during movement of the tubular and web members; and
feeding the electrodes into the arc during movement of the tubular and web members at a rate consistent with maintenance of the arcs whereby welds symmetrical about the horizontal centerline of the tubular and web members result, the depth of the fusion zone into the walls of the tubular members is minimized and welding from one side only is permitted.

2. The process of claim 1 wherein the step of locating the electrodes further comprises:
inclining the electrodes at least 5° from the vertical in the direction of the seams to be welded.

3. A process for joining a pair of tubular metallic members comprising:
placing the tubular members in substantially parallel, spaced apart relationship on a support, the spacing between the supported tubular members not exceeding 1½ inches;
supporting an elongated metallic web member intermediate but spaced from the tubular members at the point of minimum separation therebetween, the gaps thus formed between the tubular and web members defined a pair of seams to be welded;
positioning an expendable welding electrode adjacent to each seam to be welded, the tips of the electrodes being spaced from ½ to ¾ inch from the top of its respective seam, the electrodes being substantially aligned transverse to the axes of the tubular members and being angled approximately 6° in the direction of the seams;
depositing granular submerged arc type welding flux having a fineness of 10 x 150 mesh to 20 x 150 mesh on the web member and in the seams beneath the electrodes;
applying in phase alternating currents in the range of 580 to 700 amperes to the electrodes to establish an arc between each electrode and the adjacent tubular member and the web member to thereby cause melting of the flux and fusion of the electrode material, tubular members and web member;
moving the tubular and web members past the electrodes at a speed of from 22 to 26 inches per minute;
continuing to deposit the welding flux adjacent the stationary electrodes during the movement of the tubular and web members; and
feeding the electrodes into the arcs during the movement of the tubular and web members at a rate consistent with the maintenance of the arcs.

References Cited

UNITED STATES PATENTS

| | | | |
|---|---|---|---|
| 1,610,920 | 12/1926 | Bethenod | 219—131 |
| 2,911,517 | 11/1959 | Armstrong | 219—137 |
| 2,993,983 | 7/1961 | Carpenter et al. | 219—124 |
| 3,258,577 | 6/1966 | Smith | 219—137 |

RICHARD M. WOOD, *Primary Examiner.*